United States Patent Office 3,220,795
Patented Nov. 30, 1965

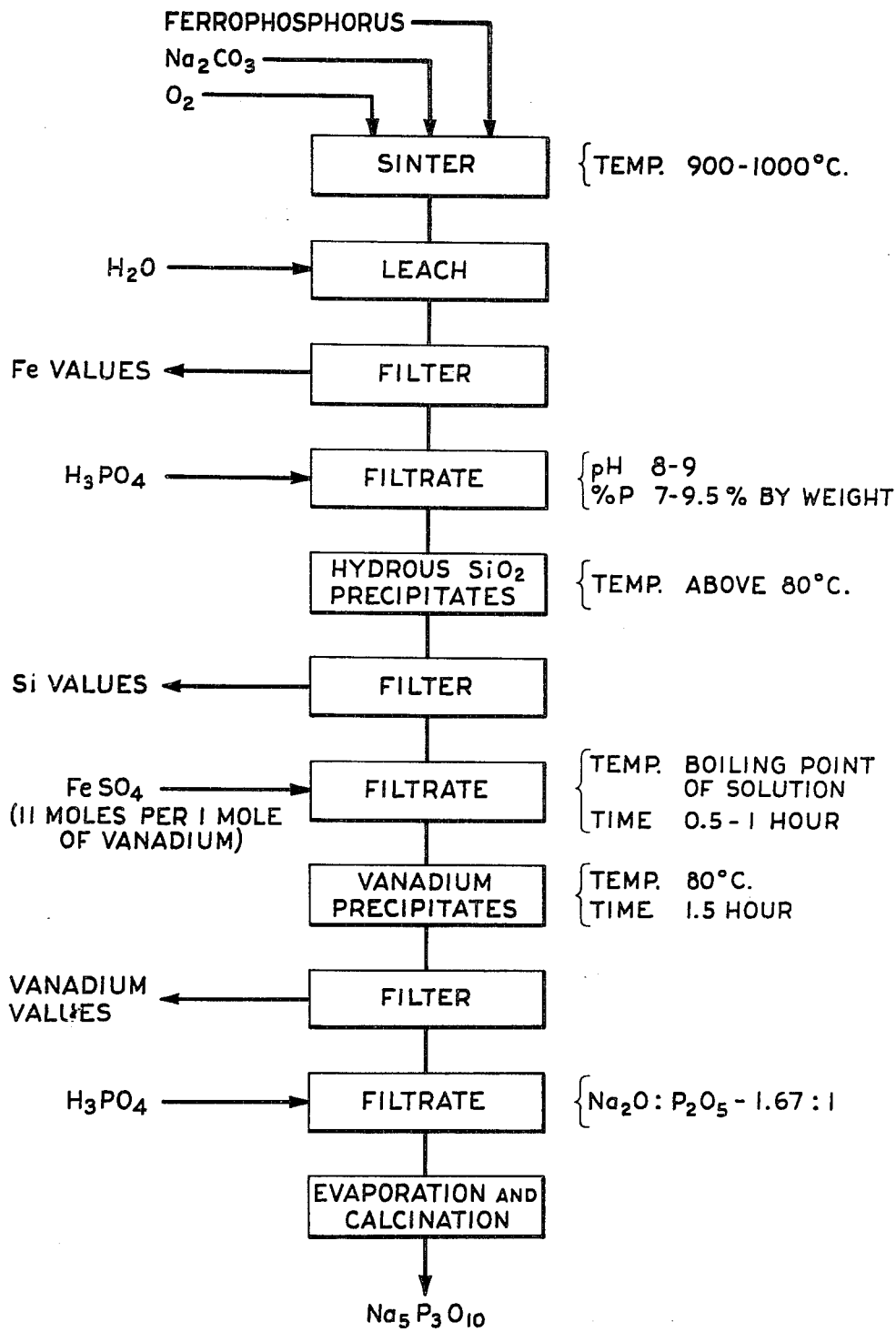

3,220,795
TREATMENT OF FERROPHOSPHORUS
John A. Peterson, Niagara Falls, N.Y., and Rufus G. Hartig, Jeffersonville, Ind., assignors to Hooker Chemical Corporation, Niagara Falls, N.Y., a corporation of New York
Filed July 18, 1962, Ser. No. 210,780
9 Claims. (Cl. 23—107)

This invention relates to the treatment of ferrophosphorus and more particularly, it relates to a process for treating ferrophosphorus so as to convert the phosphorus values therein to a more commercially desirable form.

In the commercial manufacture of elemental phosphorus by the electric furnace reduction of phosphate ores, the iron present in the phosphate ore forms iron phosphides which are known under the generic name of ferrophosphorus. This material generally contains about twenty-two to twenty-six percent by weight phosphorus, corresponding to an impure mixture of $Fe_2P$ and $FeP$. Additionally, the ferrophosphorus also generally contains up to several percent by weight silicon as an impurity.

Although there is a considerable market for ferrophosphorus in the iron and steel industry, for use in iron metallurgy processes, to be suitable for such use, concentration and purification of the ferrophosphorus is necessary to increase the phosphorus content and decrease the silicon content. Inasmuch as such treatment is expensive, it is extremely desirable if the ferrophosphorus can be processed in some manner so as to convert the phosphorus values therein to the form of phosphates which can be recovered in a pure form.

While numerous processes have been proposed for treating the ferrophosphorus so as to recover the phosphorus values therein in the form of phosphates, the processes are, basically, quite similar. Generally, these processes involve roasting or sintering the ferrophosphorus and an alkaline material, leaching the sintered product with water, purifying the leach liquor, and, thereafter, converting the phosphorus values in the leach liquor to phosphates. In such processes, difficulties have heretofore been encountered in the purification of the leach liquor, particularly with regard to the removal of silicon and vanadium impurities. While numerous methods have been proposed for removing the silicon and vanadium impurities from the leach liquor, none of these have been completely satisfactory in that, even after such treatment, the impurity level, and, particularly, the vanadium, is still undesirably high. Moreover, in these processes, difficulties have frequently been encountered in the filtration of the leach liquor, the filtration being somewhat slow, thus increasing the overall operating cost of the process.

It is, therefore, an object of the present invention to provide a process wherein the phosphorus values in ferrophosphorus are easily converted to the form of phosphates, which phosphates are readily recovered in a substantially pure form.

A further object of the present invention is to provide a process wherein the phosphorus values of a ferrophosphorus material are converted to phosphates, wherein the silicon and vanadium impurities are readily removed without encountering difficulties of filtration.

These and other objects will become apparent to those skilled in the art from a description of the invention which follows.

The drawing which is attached hereto and forms a part hereof is a flow diagram of a preferred process of the present invention.

The method of the present invention envisions heating ferrophosphorus and an alkaline material under oxidizing conditions at a temperature and for a sufficient period of time to effect oxidation of substantially all of the phosphorus values in said ferrophosphorus, and to further effect formation of an alkali metal phosphate. The resulting product is then leached to extract the alkali metal phosphate therefrom and produce an aqueous phase containing the alkali metal phosphate, silicon values and vanadium values; and a solid phase containing substantially all of the iron values from the ferrophosphorus. The aqueous phase is then separated from the solid phase. The pH of the thus-separated aqueous phase is adjusted with phosphoric acid to within the range of about 8.0–9.0, and the phosphorus concentration in the aqueous phase is adjusted to within the range of about 7.0–9.5 percent by weight phosphorus, this adjustment of the pH and phosphorus, upon subsequent heating, effecting a precipitation of hydrous silica from the aqueous phase. Ferrous sulfate is then added to the aqueous phase, while the temperature thereof is maintained at substantially its boiling point, and the phosphorus concentration is maintained within the range of about 7.0–9.5 percent by weight, the amount of ferrous sulfate added being within the range of about 10 to 15 moles of $FeSO_4$ for every one mole of vanadium in the aqueous phase. This addition of ferrous sulfate results in the formation of a precipitate which contains a major amount of the vanadium from the aqueous phase. The slurry resulting from the formation of this precipitate is agitated at an elevated temperature, but below the boiling point of the slurry, and, thereafter, the solid portion of this slurry is removed to produce a solution of the alkali metal phosphate containing substantially no silicon values, and only minor amounts of vanadium.

It is to be understood as used in the specification and claims the term "alkaline material" is intended to refer to the alkali metal oxides, hydroxides, and carbonates. Of these, because of their low cost, the preferred alkaline materials are the alkali metal carbonates. Additionally, it is to be understood that the term "alkali metal" is intended to refer to sodium, potassium, lithium, rubidium, and cesium. Of these, because of its low cost and ready availability, the preferred alkali metal is sodium. Accordingly, hereinafter, primary reference will be made to sodium carbonate as being the preferred alkaline material. This reference to sodium carbonate, however, is not to be taken as a limitation of the present invention, but merely as being exemplary thereof.

More specifically, in the practice of the present invention, a reaction charge is prepared by forming a mixture of ferrophosphorus and sodium carbonate. The ferrophosphorus, as is well known in the art, is an iron phosphide composition, generally containing about twenty-two to twenty-six percent by weight phosphorus and corresponding roughly to a mixture of $Fe_2P$ and $FeP$. The principal impurities occurring in the ferrophosphorus are: silicon, vanadium, chromium, nickel, manganese, as well as trace amounts of other elements. Of these, the silicon and vanadium are the major impurities. Preferably, the ferrophosphorus which is admixed with the sodium carbonate is in finely-divided form, e.g., having a particle size of about 200 mesh, i.e., particles which will pass through a screen having 200 openings per linear inch. Generally, the quantity of sodium carbonate admixed with the ferrophosphorus will be in excess of the theoretical amount required to react with all of the phosphorus present to form trisodium phosphate. Amounts of sodium carbonate which are about ten percent in excess of the theoretical amount required have been found to be satisfactory.

The reaction mixture of ferrophosphorus and sodium carbonate, or similar alkaline material, is heated under oxidizing conditions in any suitable reactor, e.g., a multiple hearth gas-fired furnace. The reaction temperatures used are generally within the range of about 900 to 1000° C., and the reaction time is that which will be sufficient to effect oxidation of substantially all of the phosphorus values in the ferrophosphorus to phosphates, with the formation of the corresponding alkali metal phosphate, e.g., trisodium phosphate ($Na_3PO_4$). Although it is not essential, excellent results have been obtained in the present process when the reaction product of ferrophosphorus and sodium carbonate is sintered, and for this reason heating of the reaction mass to produce sintering thereof is preferred. The reaction which takes place upon heating the ferrophosphorus and sodium carbonate under oxidizing conditions may be expressed generally as follows:

$$9Na_2CO_3 + 6Fe_2P + 15\tfrac{1}{2}O_2 \rightarrow 6Na_3PO_4 + 4Fe_3O_4 + 9CO_2$$

Once the above reaction is substantially complete, the sintered product is quenched in water and leached so as to extract the $Na_3PO_4$. It is to be noted that in the above reaction, substantially all of the vanadium values and a large portion of the silicon values are converted to sodium vanadate and sodium silicate. These materials, as well as any unreacted sodium carbonate, are also extracted with the sodium phosphate during the leaching. Substantially none of the iron values, either as iron oxide, e.g., magnetite, or as unreacted ferrophosphorus, are extracted by the leaching step. As a result of this leaching, there is formed a slurry containing sodium phosphate, sodium silicate and sodium vanadates in the aqueous phase, and with substantially all of the iron values, as well as other metallic impurities, in the solid phase.

This slurry is then processed so as to separate the aqueous and solid phases. This may be done in any convenient manner, as, for example, by filtering, centrifuging, or the like. Preferably, the slurry is passed through a hydrocyclone wherein the larger and heavier particles of solids are removed. Thereafter, the remainder of the solid phase of this slurry is removed by filtration. The clarified filtrate resulting from this filtration will generally be about 23° Baumé and will contain about twenty percent by weight $Na_3PO_4$, three to four percent by weight of $Na_2CO_3$, 0.1 to 0.2 percent by weight $SiO_2$ and about 150 p.p.m. vanadium. Additionally, the filtrate will generally have a pH in the range of about 10 to 11. The pH of this filtrate is then adjusted with phosphoric acid, to be within the range of about 8 to 9, a pH within the range of about 8.2 to 8.5 being specifically preferred. The filtrate, at about 35° Baumé is then evaporated to a phosphorus concentration within the range of about 7.0 to 9.5 percent by weight, a phosphorus concentration within the range of about 8.5 to 9.0 percent by weight being specifically preferred. Although any phosphoric acid may be used in adjusting the pH of the filtrate to the desired range, in view of the subsequent evaporation step, it is preferred that a more concentrated phosphoric acid solution be used. Accordingly, as well as for economic considerations, it is generally preferable that commercial phosphoric acid solutions containing about seventy-five to eighty-five percent phosphoric acid be used.

Once the desired pH and phosphorus concentration is obtained in the filtrate, precipitation of the silicon values, generally as a hydrous silica occurs. Although the temperature at which the filtrate is maintained during the addition of the phosphoric acid for pH adjustment and for subsequent phosphorus concentration adjustment is not critical, a temperature from room temperature up to the boiling point of the solution being suitable, the temperature of the filtrate during the precipitation of the silica is critical. In this regard, it is to be noted that in order to obtain the hydrous silica in a readily filterable form, it is necessary that the filtrate be heated to a temperature in excess of about 80° C., and preferably, within the range of about 90° C. to 100° C., and this temperature should be maintained until the precipitation and coagulation of the silica is substantially complete. Generally, this period of time will be about thirty minutes. It has been found that where this temperature is not maintained in the filtrate, the precipitation of the silica is frequently very difficult to initiate and, additionally, the precipitate is in a slimy, substantially unfilterable form. Where the temperature of the filtrate is maintained in excess of about 80° C., precipitation of the silica begins substantially immediately, and the form of the silica is either a bulky, flocculent solid, or a firm, non-slimy hydrogel particle, depending on the amount of sodium carbonate present in the filtrate. In either of these latter forms, the silica precipitate is readily filterable and filtration is quite rapid.

Once the silica precipitate has been formed, it may be removed from the solution in any convenient manner, as, for example, by filtration, centrifuging or the like. It is not, however, necessary that the silica precipitate be removed at this point in the process. If desired, it may remain in the solution during the subsequent treating steps to remove the vanadium impurities, with no adverse effect on these treating steps. The advantage in not removing the silica precipitate at this point in the process is that only a single filtration will thus be required, wherein both the silica and vanadium impurities are removed. It has been found, however, that by removing the silica precipitate prior to the vanadium removal steps in the process, a slightly faster filtration rate for removal of the vanadium impurities is subsequently obtained. It is for this reason that it is generally preferred to remove the silica precipitate from the solution prior to the additional treating steps for vanadium removal. It is emphasized, once again, however, that such a procedure is merely preferred and is not essential to the operation of the present process.

Once the silica precipitate has been removed from the solution, the temperature of the filtrate is raised to boiling, and is maintained at this temperature while ferrous sulfate is added to the filtrate. The ferrous sulfate, preferably as a solution containing about 20 to 50 percent by weight $FeSO_4 \cdot 7H_2O$, is added in an amount within the range of about 10 to 15 moles of $FeSO_4$ to each mole of vanadium in the filtrate. The addition of the ferrous sulfate is generally carried out over an extended period of time, generally 30 minutes to an hour, while continuing the boiling of the filtrate. Not only is it important that the filtrate be boiled during the addition of the ferrous sulfate, but, additionally, the pH thereof and the phosphorus concentration should be maintained within the range as previously established during the precipitation of the silica.

During the addition of the ferrous sulfate to the solution, the vanadium contained therein is precipitated out. It is believed that the vanadium precipitates as a complex iron-vanadium phosphate compound. The thus-formed slurry of the vanadium precipitate complex in the phosphate solution is preferably boiled for an additional 30 minutes to one hour, following the addition of the ferrous sulfate. The temperature of the slurry is then reduced, preferably to about 80° C., and held there for an additional one to two hours, while agitation of the slurry is continued. It is to be noted that during this holding time of the slurry, the temperature thereof should not be substantially below about 80° C. Although the slurry is preferably not boiled during this time, temperatures from 80° C. up to a boiling point can be used without adversely affecting the process. During this holding time, as during the boiling time and the addition of the ferrous sulfate, the pH of the slurry should be maintained within the range of about 8 to 9, and, preferably, about 8.2 to 8.5, while the phosphorus content of the slurry should be maintained within the range of about 7.0 to 9.5, preferably, about 8.5 to 9.0 percent by weight phosphorus. Where these conditions of pH and phosphorus concentration are not maintained, filtration of the slurry to remove the vanadium complex precipitate, becomes very difficult if not impossible, and, additionally, the filtrate contains undesirably high quantities of iron or of vanadium.

With regard to the effect of the pH and phosphorus concentration on the filterability of the solution so as to remove the vanadium precipitate, it has been found that when the pH is substantially below 8.0, the slurries were extremely slow filtering. This has been found to be true even with slurries which were formed at a pH below 8.0 and then adjusted to a pH in excess of 8.0. The slow filtering characteristics of such slurries were still retained. Similarly, with regard to the phosphorus concentration, when the phosphorus concentration is greater than about 9.5 percent by weight, filtration of the slurry is extremely difficult. This difficulty of filtration has been found to be retained even though the slurry is rediluted to obtain a phosphorus concentration below about 9.5. From this, it is quite apparent that the maintenance of the pH and phosphorus concentration during the entire process is quite important in order to obtain precipitates which are readily filterable from the solutions. Similarly, the elevated temperatures and the holding times of the slurry, after formation of both the silica precipitate and vanadium precipitate, have also been found to be important in order to form a precipitate which is readily filterable.

After the slurry containing the vanadium precipitate has been aged at the elevated temperature for the desired length of time, the precipitate can be removed from the solution in any suitable manner, e.g., by filtration or centrifuging. Prior to the removal of the vanadium precipitate, however, if it is desired to produce a filtrate having a lower iron content, an alkaline earth metal hydroxide may be added to the slurry. The alkaline earth metal hydroxide may suitably be calcium hydroxide or barium hydroxide, with calcium hydroxide being preferred. The calcium hydroxide is added to the slurry while the temperature is maintained at substantially below about 80° C., the calcium hydroxide being added in an amount generally within the range of about 0.1 to 0.2% by weight of the slurry. Preferably, the calcium hydroxide is added in several portions over a period of several minutes following which addition the thus-limed slurry is held at a temperature not substantially below 80° C. for about 30 minutes. Separation of the solid materials from the slurry is then effected as by filtration, and a filtrate is obtained which contains only minor amounts of vanadium and iron as impurities. A typical filtrate thus obtained may contain about 8.7 percent phosphorus, about 24 p.p.m. vanadium, about 63 p.p.m. iron, and a trace of silica.

The thus-obtained filtrate may then be treated so as to obtain a sodium phosphate product. Preferably, this filtrate is held at a temperature within the range of about 80° C. up to the boiling point of the filtrate for a period of several hours to allow sufficient time for any "post-precipitation" of iron phosphate salts from the solution. In this manner, a more highly purified phosphate solution can be obtained. This additional holding step is, however, not essential to the present process, since its primary purpose is to achieve a greater reduction in iron impurities, the removal of which impurities is not as essential as is the removal of the vanadium impurities. Once the "post-precipitation" of any iron phosphate salts has occurred, this precipitate may be removed by filtration, as, for example, by passing the solution through a polishing filter. The thus-obtained filtrate is an aqueous solution of sodium orthophosphate containing only minor amounts of impurities.

This solution of sodium orthophosphates may then be subjected to crystallization to obtain solid sodium orthophosphates. Preferably, however, phosphoric acid is added to the filtrate so as to obtain a $Na_2O$ to $P_2O_5$ ratio of 1.67:1. This $Na_2O$ to $P_2O_5$ ratio corresponds to that of sodium tripolyphosphate. After the $Na_2O$ to $P_2O_5$ ratio in the solution has been thus-adjusted, the solution is evaporated to dryness and the resulting solid residue is calcined for a period sufficient to drive off all the water, thus producing sodium tripolyphosphate ($Na_5P_3O_{10}$). The thus-obtained sodium tripolyphosphate is white in color and contains no more than about 50 to 60 p.p.m. vanadium and no more than 150 p.p.m. iron.

Referring now to the drawing, this is a flow diagram of the preferred process of the present invention. As is shown in the drawing, ferrophosphorus, sodium carbonate and oxygen are sintered at a temperature within the range of 900° C. to 1000° C. The sintered product obtained is then leached with water and filtered to remove the iron values. The pH of the resulting filtrate is then adjusted to within the range of about 8 to 9, and the phosphorus concentration thereof is adjusted to within the range of 7.0 to 9.5 percent by weight, the pH adjustment being made by the addition of phosphoric acid. The temperature of the filtrate is then maintained above about 80° C. so as to effect precipitation of the hydrous silica. This precipitated silica is then removed by filtration, and the resulting filtrate is maintained at the boiling point for a period of about 30 minutes to one hour, during which time the ferrous sulfate is added to the filtrate in an amount of about 11 moles of ferrous sulfate to each mole of vanadium. The vanadium is precipitated in the filtrate and the temperature of the filtrate is maintained at about 80° C. for an additional time of about 1.5 hours. The vanadium values are then removed by filtration, and the $Na_2O$ to $P_2O_5$ ratio of the resulting filtrate is adjusted to about 1.67:1 by the addition of phosphoric acid. The filtrate is then evaporated and calcined so as to produce sodium tripolyphosphate.

It must be emphasized, once again, the importance of maintaining the pH, and phosphorus concentration within the ranges set forth hereinabove, during the treating steps for precipitation and removal of the silica impurities and the vanadium impurities. Additionally, the utilization of the proper temperature and holding times are also important in the present process in order that the precipitates obtained from the solutions are readily filterable. Where these conditions are not met, the precipitate which results is in a form which can only be filtered with great difficulty, if at all. It is believed to be quite apparent to those skilled in the art that any such difficulties encountered in either the formation or removal of the precipitate from the solution add greatly to the complexity and cost of the process, thus making it economically unfeasible. Accordingly, when the process operating conditions as set forth hereinabove are followed, there results a relatively simple and economically feasible process for converting the phosphorus values in ferrophosphorus to phosphates which are recovered in a substantially pure and salable form.

In order that those skilled in the art may better understand the method of the present invention and the manner in which it may be practiced, the following specific examples are given.

Example 1

892 parts by weight of a finely-ground ferrophosphorus (200 mesh) containing 23 percent by weight phosphorus is mixed with 1160 parts by weight of soda ash. This amount of soda ash is sufficient to provide a ten percent excess over the amount theoretically required. This mixture is charged into the top of a multiple hearth direct-fired furnace, wherein it is brought to a temperature of about 950° C., in the presence of excess oxygen. When the mixture is substantially completely sintered, the sintered product is admixed with water to leach out $Na_3PO_4$, along with sodium carbonate, sodium vanadate, and sodium silicate. The resulting slurry is about 43° Baumé. This slurry is then passed through a hydrocyclone wherein the dense insoluble materials, i.e., unreacted ferrophosphorus, magnetite and other iron oxides, are separated from the slurry. The supernatant slurry, at 35° Baumé is then filtered in a pre-coated vacuum drum filter to remove very fine insolubles. The resulting filtrate, at 23° Baumé contains 185 parts by weight phosphorus (90 percent of the phosphorus in the ferrophosphorus reaction charge) presents as 980 parts by weight of $Na_3PO_4$, 110 parts sodium carbonate, 4 parts $SiO_2$, as sodium silicate, and 0.74 part vanadium, as sodium vanadate. The filtrate is then evaporated to a phosphorus concentration of about 8.5 percent by weight phosphorus which is about 44° Baumé. The 44° Baumé liquor, which is at a pH within the range of 10 to 12, is transferred to a treatment tank wherein the pH is adjusted to 8.2 by the addition of phosphoric acid having a concentration of 75 percent by weight. The liquor is then held at a temperature within the range of 80 to 90° C. for about 30 minutes, during which time precipitation and coagulation of better than 90 percent of the $SiO_2$ which is present occurs. This hydrous $SiO_2$ is not removed from the liquor at this point in the process. The temperature of the liquor is then raised to the boiling point, i.e., in excess of 100° C., and 27 pounds of $FeSO_4$, dissolved in water to make a 25 percent by weight solution, is added slowly to the hot liquor. The addition time of the $FeSO_4$ is about one hour, during which time the liquor is stirred vigorously. During this time, a precipitate of iron phosphate and iron vanadium phosphate is formed. The resulting slurry is maintained at a temperature of 80° C. for about one hour and thirty minutes after the addition of the $FeSO_4$ is completed. After about one hour of this retention time, lime [$Ca(OH)_2$] is added to the slurry in an amount of about 0.1 percent by weight of the slurry. During the addition of the lime, the temperature of the slurry is maintained at 80° C. After the hour and thirty-minute retention time, the slurry is filtered and the resulting filter cake is washed with water in an amount of 16 parts of water for each 100 parts of the 44° Baumé liquor. The wash waters are not combined with the liquor. The 44° Baumé liquor filtrate is then maintained at a temperature of 80° C. for about two hours, during which time "post-precipitation" of iron phosphate compounds occur. These compounds are then removed by passing the liquor through a polishing filter. To the resulting clarified filtrate, phosphoric acid having a concentration of about 75 percent by weight, is added until a molar ratio of Na/P of 1.67:1 is obtained in the liquor. The pH of the liquor at this point is about 6.7. The resulting liquor is then evaporated to dryness and the thus-obtained solids are calcined to produce sodium tripolyphosphate. The thus-produced sodium tripolyphosphate product is white in color and contains 50 p.p.m. vanadium and 150 p.p.m. iron.

*Example 2*

The procedure of Example 1 is repeated with the exception that the hydrous $SiO_2$ precipitate obtained is removed from the liquor by filtration prior to the addition of the $FeSO_4$ solution. The remaining steps of the process are then carried out in the same manner as is set forth in Example 1. The resulting sodium tripolyphosphate product obtained is substantially identical to that obtained in Example 1, being white in color, and containing about 50 p.p.m. vanadium, and about 150 p.p.m. iron.

From a comparison of Examples 1 and 2, it is seen that in the present process there is no susbtantial difference in the sodium tripolyphosphate product obtained, regardless of whether the hydrous $SiO_2$ precipitate is removed in a separate filtration step before the addition of the ferrous sulfate solution, or whether it remains in a liquor to be removed, concurrently, by filtration, with the vanadium precipitate.

*Example 3*

To show the effect of pH of the liquor on silica removal, the following two runs were made. In these runs, a leach solution, as obtained in the first part of Example 1, is used. This solution contains about 30 percent by weight trisodium phosphate, and about 0.1 percent by weight $SiO_2$. In both of these runs, the phosphoric acid used had a concentration of about 85 percent by weight.

(a) In this run, the phosphoric acid is added to the trisodium phosphate leach solution until a pH of 7 is obtained. During the addition of the acid, the mixture is maintained at a temperature within the range of about 60–80° C. The hydrous silica is precipitated from the solution at pH 7 in the form of small gell particles. This precipitate filters extremely slowly and is very slimy in nature.

(b) The procedure of part (a) is repeated with the exception that the phosphoric acid is added to the trisodium phosphate solution only until a pH of about 8.2 is reached, the temperature of the solution being substantially the same, as part (a). The precipitation of the hydrous silica occurs at pH 8.2 in a flocculent form. The filtration rate of this precipitate at a pH 8.2 is extremely fast and the filter cakes obtained are grainy in nature, and do not become slimy even on compacting.

From the above results, it is clearly seen that the pH of the phosphate solution during the time of silica precipitation is quite critical, in terms of the filterability of the precipitate which is obtained.

*Example 4*

To show the effect of temperature on the solution during the precipitation of the silica, a series of three runs is made in which the temperature conditions during the precipitation of the silica are varied. In these runs, a phosphate solution containing about 12 percent by weight trisodium phosphate, and about 1 percent by weight $SiO_2$ is used. The phosphoric acid used has a concentration of about 85 percent by weight.

(a) The concentrated phosphoric acid is added to the phosphate solution while the mixture is maintained at a temperature within the range of 30 to 40° C. When the addition of the phosphoric acid has proceeded to a pH within the range of about 9.0 to 9.5, large chunks of a soft silica hydrogel are formed in the solution. Acid additions to the solution to lower the pH resulted in the entire mixture gelling up. It was, therefore, impossible to filter the solution and remove the silica therefrom.

(b) The concentrated phosphoric acid is added to the trisodium phosphate solution which is maintained at a temperature within the range of 90 to 100° C. The addition of the phosphoric acid is continued until a pH of 8.0 is obtained. Precipitation of the silica occurs at this pH and temperature, the precipitate being a grainy, non-slimy precipitate which has a fast filtration rate. That the silica precipitation is substantially complete at this point was evidenced by the fact that upon further acidification of the filtrate to a pH of 6.7, no additional silica was precipitated.

(c) The concentrated phosphoric acid is added to the trisodium phosphate solution until a pH of 8.0 is obtained. During this addition of the acid, the mixture is held at a temperature within the range of 30 to 40° C. As soon as a pH of 8 is obtained, the mixture is heated to 95 to 100° C. At this point, precipitation of the silica occurs. Removal of this precipitate by filtration is then at a very fast rate, the precipitate being grainy and non-slimy in form.

From these results, it is clearly seen that the temperature of the solution during the time of precipitation of silica is extremely important, and that where temperatures which are substantially below about 80° C. are used, separation of the silica precipitate from the solution is extremely difficult if not impossible.

*Example 5*

In order to show the effect of pH during the vanadium removal portion of the present process, a series of four runs, A through D are made. In these runs, a phosphate solution from which the silica has been removed in accordance with the procedures set forth in the preceding examples, is treated with ferrous sulfate to effect removal of the vanadium in the solution. The ferrous sulfate is added to the solution while it is maintained at the boiling point, and the pH measurement of the solution is made at the time of the addition of the ferrous sulfate to the liquor. Once the vanadium precipitate has been formed in the solutions, a 50 millimeter portion of the thus-formed slurry is filtered through a two-inch diameter Büchner funnel, the bed of which is precoated with a diatomaceous earth filter aid. A vacuum equivalent to 20 inches of mercury is utilized during the filtration. The time required for the filtration was noted, this time being that which is required for the disappearance of the liquid phase from the surface of the filter cake on the filter. This procedure was repeated for a total of four times using a 50 millimeter portion of the slurry each time. The filter cake on the filter which remained from the previous filtration was not disturbed during the subsequent filtrations. In Runs C and D, lime was added to the slurry prior to the time of filtration so as to effect a more complete removal of iron from the solution. The filtrate collected from the filtrations was then treated in the manner set forth in Example 1 to produce a crystalline sodium tripolyphosphate, which material was then analyzed for vanadium content. Using this procedure, the following results were obtained.

From these results, it is seen that at lower phosphorus concentrations in the filtrate, although the filtration times are not appreciably increased between the first and the fourth filtrations, the vanadium content of the final sodium tripolyphosphate product is undesirably high. In contrast, considering Run C, when the preferred phosphorus concentration is used, a satisfactory vanadium content in the final sodium tripolyphosphate product is obtained, while a satisfactory filtration time has still been retained. Additionally, it is seen that when a higher phosphorus concentration is used in the filtrate, e.g., about 9% by weight, a satisfactory level of vanadium content is still obtained in the sodium tripolyphosphate product, although there is a slightly greater increase in the filtration times between the first and fourth filtrations.

*Example 7*

To show the effect of the amount of ferrous sulfate added in the vanadium removal portion of the present process, two runs are made using different amounts of ferrous sulfate. The procedure followed in these runs is the same as that of Example 5. Using this procedure, the following results are obtained:

| Run | pH | Moles of FeSO$_4$ Added per Mole of V in Solution | Additive | Percent P in Filtrate | P.p.m. V in STPP | P.p.m. Fe in STPP | Filtration Times (sec.) | | | |
|---|---|---|---|---|---|---|---|---|---|---|
| | | | | | | | First | Second | Third | Fourth |
| A | 8.2 | 7.5 | None | 6.73 | 93 | 90 | 17 | 19 | 21 | 26 |
| B | 8.2 | 11.9 | do | 6.43 | 33 | 265 | 20 | 26 | 32 | 40 |

Additional runs using amounts of ferrous sulfate in excess of about 16 moles of ferrous sulfate to one mole of vanadium show that, although there is some additional

| Run | pH | Moles of FeSO$_4$ Added per Mole of V in Solution | Additive | Percent P in Filtrate | P.p.m. V in STPP | P.p.m. Fe in STPP | Filtration Times | | | |
|---|---|---|---|---|---|---|---|---|---|---|
| | | | | | | | First | Second | Third | Fourth |
| A | 8.20 | 11.9 | None | 8.78 | 27 | Not determined | 23 sec | 25 sec | 30 sec | 38 sec. |
| B | 6.75 | 11.5 | do | 8.95 | 57 | do | 28 sec | 1 min., 35 sec. | 2 min., 53 sec. | 5 min. |
| C | 8.20 | 11.9 | Ca(OH)$_2$ | 8.73 | 58 | do | 24 sec | 33 sec | 50 sec | 1 min. |
| D | 6.75 | 11.3 | Ca(OH)$_2$ | 8.29 | 30 | do | 22 sec | 1 min., 35 sec. | 2 min., 20 sec. | 3 min., 25 sec. |

From these results, it is clearly seen that where a high pH is used, e.g., 8.2, there is only a relatively small increase in the time required for filtration between the first and the fourth filtrations. In contrast, when a lower pH of about 6.75 is used, there is an appreciably greater increase in the time required for filtration between the first and the fourth filtrations. It is further seen that this increase in the filtration time results, regardless of whether the lime is added to the slurry to aid in iron removal prior to the time of the slurry filtration.

*Example 6*

In order to shown the effect of the phosphorus concentration during the time of the vanadium precipitation, a series of four runs is made. In these runs, the procedure used is the same as that of Example 5. Using this procedure, the following results are obtained:

vanadium removal, the amount removed is not significantly greater than that removed using the preferred molar ratio within the range of 10 to about 15 moles of ferrous sulfate to one mole of vanadium.

From the above results, it is seen that where molar ratios of ferrous sulfate to vanadium are significantly less than about 10:1, as in Run A, there is a considerable increase in the amount of vanadium in the sodium tripolyphosphate product produced. Although at higher molar ratios of ferrous sulfate to vanadium, the filtration time is slightly increased from the first to the fourth filtration, this increase is not sufficiently significant to be detrimental to the process.

*Example 8*

In order to show the effect of the temperature at the time of the ferrous sulfate addition to the filtrate, a series

| Run | pH | Moles of FeSO$_4$ Added per Mole of V in Solution | Additive | Percent P in Filtrate | P.p.m. V in STPP | P.p.m. Fe in STPP | Filtration Times | | | |
|---|---|---|---|---|---|---|---|---|---|---|
| | | | | | | | First | Second | Third | Fourth |
| A | 9.0 | 10.0 | Ca(OH)$_2$ | 5.87 | 155 | 15 | 15 sec | 26 sec | 34 sec | 45 sec. |
| B | 8.2 | 10.0 | Ca(OH)$_2$ | 6.33 | 125 | 43 | 16 sec | 21 sec | 36 sec | 46 sec. |
| C | 8.2 | 11.9 | Ca(OH)$_2$ | 8.73 | 58 | 155 | 24 sec | 33 sec | 50 sec | 1 min. |
| D | 8.2 | 11.9 | Ca(OH)$_2$ | 9.00 | 68 | 98 | 32 sec | 1 min., 32 sec. | 2 min | 2 min., 40 sec. | of four runs are made. In these runs, the filtrate is at a pH of 6.75 at the time of addition of the ferrous sulfate. The ferrous sulfate is added, in either a solution or as a solid, in several portions. The vanadium precipitate formed as a result of the ferrous sulfate additions is removed by filtration, and the resulting filtrate has a phosphorus concentration in the range of 10 to 11%. The starting solutions, to which the ferrous sulfate is added, had a vanadium content in the range of 500 to 700 p.p.m. vanadium. The filtrate obtained after the vanadium precipitate is removed is treated in accordance with the procedure of Example 1, so as to obtain a crystalline sodium tripolyphosphate product. Using this procedure, the following results are obtained:

| Run | Form of FeSO₄ Added | Moles of FeSO₄ Added per Mole of V in Solution | Temp. During Time of Addition, °C. | Time for Addition, hrs. | P.p.m. V in STPP Product |
|---|---|---|---|---|---|
| A | Sol | 12.3 | 80 | 2.5 | 300 |
| B | do | 11.4 | Boil | 2.5 | 110 |
| C | Solid | 12.3 | 80 | 2.5 | 310 |
| D | do | 25.0 | Boil | 2.5 | 104 |

From the above results, it is seen that when the temperature of the solution to which the ferrous sulfate is added is maintained at the boiling point, the amount of vanadium present in the sodium tripolyphosphate product produced is considerably less than when the temperature during the time of the ferrous sulfate addition is below the boiling point, as, e.g., at 80° C.

By operating the process of the present invention in the manner as has been set forth hereinabove, the phosphorus values contained in ferrophosphorus are recovered in the form of phosphates in a readily usable or salable condition. Moreover, this process has been found to be both economical and efficient to operate, and has, thus, been found to be a considerable improvement over those processes presently known in the art.

While there have been described various embodiments of the invention, the methods described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for obtaining alkali metal phosphates from ferrophosphorus which comprises heating ferrophosphorus and an alkaline material selected from the group consisting of alkali metal oxides, alkali metal hydroxides, and alkali metal carbonates, under oxidizing conditions at a temperature and for a period of time sufficient to effect oxidation of substantially all of the phosphorus values in the ferrophosphorus and form a trialkali metal phosphate, the alkaline material being present in at least the theoretical amount required to effect formation of the trialkali metal phosphate, leaching the resulting material with water to extract the trialkali metal phosphate therefrom, and produce an aqueous phase containing the trialkali metal phosphate, silicon values and vanadium values, and a solid phase containing substantially all of the iron values in the ferrophosphorus, separating the said aqueous phase from the solid phase, adjusting the pH of the thus-separated aqueous phase with phosphoric acid to within the range of about 8.0 to 9.0, adjusting the phosphorus concentration of the aqueous phase to within the range of about 7.0 to 9.5 percent by weight phosphorus, maintaining the temperature of the aqueous phase not substantially below about 80 degrees centigrade, at least at the time immediately following the said adjustment of the pH, thereby effecting formation of a precipitate of hydrous silica in the said aqueous phase, adding ferrous sulfate to the aqueous phase, while maintaining the temperature of the aqueous phase at substantially the boiling point and while maintaining the phosphorus concentration of the aqueous phase within the range of about 7.0 to 9.5% by weight phosphorus, thereby forming a precipitate containing the major amount of vanadium from the aqueous phase, which precipitate is an insoluble iron-vanadium-phosphate compound, the amount of ferrous sulfate added to the aqueous phase being within the range of about 10 to 15 moles of ferrous sulfate for each mole of vanadium in the aqueous phase, and, thereafter, separating the thus-formed precipitate from the aqueous phase to produce a solution of trialkali metal phosphate containing substantially no silicon and only minor amounts of vanadium.

2. The process as claimed in claim 1 wherein the silica precipitate is removed from the aqueous phase prior to the addition of ferrous sulfate to the aqueous phase.

3. The process as claimed in claim 2 wherein the alkaline material heated with the ferrophosphorus is sodium carbonate and the trialkali metal phosphate solution produced is a trisodium phosphate solution.

4. The process as claimed in claim 3 wherein the sodium carbonate and ferrophosphorus are heated at a temperature within the range of about 900 to 1000 degrees centigrade and the sodium carbonate is present in an amount of about 10 percent in excess of the theoretical amount required to produce trisodium phosphate.

5. The process as claimed in claim 4 wherein the $Na_2O$ to $P_2O_5$ ratio of the trisodium phosphate solution is adjusted with phosphoric acid to about 1.67 to 1, the resulting solution is evaporated to dryness and, thereafter, the resulting solid is calcined to obtain a solid sodium tripolyphosphate.

6. The process as claimed in claim 4 wherein prior to the removal of the vanadium precipitate from the trisodium phosphate solution, calcium hydroxide is added in an amount within the range of 0.1 to 0.2 percent by weight of the trisodium phosphate solution, to effect improved removal of the iron from the solution.

7. The process as claimed in claim 5 wherein following the removal of the vanadium-containing precipitate from the solution and prior to the adjustment of the $Na_2O$ to $P_2O_5$ ratio, the aqueous solution is maintained at a temperature not substantially below about 80 degrees centigrade for a period of up to two hours, thereby effecting a post-precipitation of iron-containing compound from the solution, prior to the adjustment of the $Na_2O$ to $P_2O_5$ ratio of the solution.

8. The process as claimed in claim 3 wherein the pH of the aqueous trisodium phosphate solution is adjusted with phosphoric acid to within the range of 8.2 to 8.5 and the phosphorus concentration in the aqueous trisodium phosphate solution is adjusted to within the range of about 8.5 to 9.0 percent by weight of phosphorus.

9. The process as claimed in claim 8 wherein after the formation of the vanadium containing precipitate in the trisodium phosphate solution, the resulting slurry is agitated at a temperature not substantially below 80 degrees centigrade for a period of time sufficient to effect substantially complete precipitation and coagulation of the vanadium containing precipitate.

References Cited by the Examiner

UNITED STATES PATENTS

| 279,445 | 6/1883 | Scheibler | 23—182 X |
| 1,812,761 | 6/1931 | Stevens et al. | 23—182 |
| 1,843,006 | 1/1932 | Stevens et al. | 23—182 |
| 1,891,293 | 12/1932 | Conway et al. | 23—106 |
| 2,654,655 | 10/1953 | Banning et al. | 23—107 |
| 2,977,191 | 3/1961 | Pottiez | 23—107 |

MAURICE A. BRINDISI, *Primary Examiner.*